(12) United States Patent
Azer

(10) Patent No.: US 7,549,454 B2
(45) Date of Patent: Jun. 23, 2009

(54) BELT COAT COMPOSITION

(75) Inventor: Shahir Rafael Azer, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 84 days.

(21) Appl. No.: 11/323,127

(22) Filed: Dec. 30, 2005

(65) Prior Publication Data

US 2007/0155876 A1 Jul. 5, 2007

(51) Int. Cl.
*B60C 1/00* (2006.01)
*B60C 9/18* (2006.01)
*C08K 5/3415* (2006.01)

(52) U.S. Cl. .................. 152/537; 152/526; 524/232; 524/210; 524/104; 524/267

(58) Field of Classification Search .......... 524/227, 524/571, 575.5, 87, 94, 210, 232, 104; 525/331.9, 525/332.6, 333.1, 337.9; 152/537, 526
See application file for complete search history.

(56) References Cited

U.S. PATENT DOCUMENTS

| | | | | |
|---|---|---|---|---|
| 3,513,898 | A * | 5/1970 | Lugli et al. ................ 152/535 |
| 4,047,552 | A * | 9/1977 | Maeda et al. ............... 152/527 |
| 4,647,328 | A | 3/1987 | Rhee |
| 4,871,004 | A | 10/1989 | Brown et al. |
| 5,112,924 | A | 5/1992 | Chu et al. |
| 5,198,515 | A | 3/1993 | van Swieten et al. |
| 5,242,001 | A | 9/1993 | Kahrs et al. |
| 5,426,155 | A | 6/1995 | Hogt et al. |
| 5,503,940 | A * | 4/1996 | Majumdar et al. .......... 428/492 |
| 5,513,683 | A | 5/1996 | Causa et al. |
| 5,610,240 | A * | 3/1997 | Hogt et al. ............... 525/332.6 |
| 5,616,197 | A * | 4/1997 | Helfer et al. ................. 152/527 |
| 5,648,153 | A * | 7/1997 | Sinopoli et al. ........... 428/295.1 |
| 5,684,091 | A | 11/1997 | Maly et al. |
| 5,736,611 | A | 4/1998 | Blok et al. |
| 5,760,114 | A | 6/1998 | Wideman et al. |
| 5,792,800 | A | 8/1998 | Wideman et al. |
| 5,885,389 | A | 3/1999 | Sandstrom et al. |
| 5,985,963 | A * | 11/1999 | D'Sidocky et al. .......... 524/105 |
| 5,997,673 | A | 12/1999 | Sandstrom et al. |
| 6,070,634 | A | 6/2000 | Sandstrom et al. |
| 6,156,143 | A | 12/2000 | Maly et al. |
| 6,186,202 | B1 * | 2/2001 | Majumdar et al. ....... 152/209.6 |
| 6,326,438 | B1 * | 12/2001 | D'Sidocky et al. ....... 525/331.1 |
| 6,329,457 | B1 | 12/2001 | Datta et al. |
| 6,386,255 | B1 * | 5/2002 | Majumdar et al. .......... 152/367 |
| 6,506,849 | B1 * | 1/2003 | Hojo et al. ................ 525/332.7 |
| 6,521,713 | B2 * | 2/2003 | Wolff et al. ............... 525/331.8 |
| 6,558,471 | B2 * | 5/2003 | Brown et al. .................... 134/6 |
| 6,581,660 | B2 | 6/2003 | Meza et al. |
| 6,588,471 | B2 | 7/2003 | Majumdar et al. |
| 6,747,099 | B1 * | 6/2004 | Novits et al. ............. 525/330.9 |
| 6,823,637 | B2 * | 11/2004 | Elliott et al. .................. 52/557 |
| 6,889,735 | B2 | 5/2005 | Frank et al. |
| 6,896,932 | B2 | 5/2005 | Huang et al. |
| 7,214,741 | B2 * | 5/2007 | Resendes et al. ............ 525/387 |
| 7,417,084 | B2 * | 8/2008 | Hoopes ..................... 524/105 |
| 7,442,733 | B2 * | 10/2008 | Araujo Da Silva et al. .. 524/105 |

FOREIGN PATENT DOCUMENTS

EP 1 041 103 A2 * 10/2000
FR 2 859 730 A1 * 9/2003

OTHER PUBLICATIONS

Gold Supplier, *All-Steel Radial Medium Truck Tire*, goldenpegaus.en.alibiba.com web site, Sep. 2, 2005
Flexsys, *Perkalin 9000*, Product Data Sheet.

* cited by examiner

*Primary Examiner*—David Wu
*Assistant Examiner*—Rip A. Lee
(74) *Attorney, Agent, or Firm*—Wood, Herron & Evans L.L.P.

(57) ABSTRACT

A composition for coating steel belts used in constructing a radial medium truck (RMT) tire, having improved tensile strength and modulus retention, increased dynamic stiffness, increased fracture and tear resistance, and improved reversion resistance.

8 Claims, No Drawings

BELT COAT COMPOSITION

FIELD OF THE INVENTION

The invention relates to a brass-coated steel belt coat composition for a radial medium truck (RMT) tire construction.

BACKGROUND OF THE INVENTION

Tires generally classified as a radial medium truck (RMT) are used in a wide range of applications under a range of operating conditions. A pneumatic radial medium truck tire generally comprises at least one pair of parallel annular beads, at least one carcass ply wrapped around the beads, at least three belts or breakers disposed over the carcass ply in a crown area of the tire, a tread disposed over the belts or breakers, and sidewalls disposed between the tread and the beads. The majority of the belts or breakers in the tire are reinforced with steel filaments or cords, though the remaining belts or breakers may optionally be reinforced with organic polymer filaments or cords. The top belt or breaker may be, but is not necessarily, reinforced with organic polymer filaments or cords, depending on the particular end user application for the tire.

Optimally, the RMT tire has excellent high speed durability, good wear resistance and low rolling resistance, and generates relatively low heat and noise. The RMT tire is typically constructed in a manner which resists interlaminar shear strains which would tend to cause the tread crown to separate, but also is able to resist the radial or lateral forces during service which tend to tear the components between the belts. At the same time, the RMT tire must be able to maintain its rated operating specifications over prolonged periods of operation, even where high internal temperatures are generated which in turn tend to degrade the components in one or more tire layers during curing and service.

Typically, to maintain acceptable levels of stiffness, the RMT tire has traditionally incorporated resorcinol-containing resins which function to improve adhesion between the rubber formulation surrounding an included wire or cord and the wire or cord material. A stronger adhesive bond further imparts resistance to separation within the belt package between cord and belt for improved casing integrity. However, the use of resorcinol in the workplace is being discouraged, thus generating a need for substitute materials.

SUMMARY OF THE INVENTION

Belt coat formulations used in connection with manufacturing a radial medium truck (RMT) tire have been developed with improved long term casing durability for multiple retreads at optimum stiffness to improve stability by incorporating a package of additives into the belt coat formulation. Specifically, the combination of bis-(3-triethoxysilylpropyl)-tetrasulfide (TSPT), m-phenylenediamine bismaleimide (PDBM) and 1,3-bis (citraconimido-methyl) benzene (CIMB) work in synergy to maintain critical properties as the RMT tire ages, and produced excellent reversion resistance. Further, the formulations demonstrated improved dynamic stiffness, modulus retention, tensile retention, tear properties and aged tear properties. It is desirable that the radial medium truck tire be able to operate at higher temperatures. It is further desirable that the RMT tire maintain high modulus. Typically, high static and dynamic compound stiffness could be obtained previously by incorporating, for example, resorcinol resins in the rubber formulations. The use of these resins has been discouraged, however, due at least in part to environmental concerns.

Desirable results have been obtained in these belt coat formulations by incorporating 1,3-bis (citraconimidomethyl) benzene, m-phenylenediamine bismaleimide, and a mixture of equal parts N330-type carbon black with bis-(3-triethoxysilylpropyl)-tetrasulfide.

The features and objectives of the present invention will become more readily apparent from the following Detailed Description.

DETAILED DESCRIPTION OF THE INVENTION

Broadly, the invention is directed to belt coat compositions having improved anti-reversion properties, crack resistance, and stiffness, among other properties, for use in radial medium truck (RMT) tires. The combination of a three part package of bis-(3-triethoxysilylpropyl)-tetrasulfide, m-phenylenediamine bismaleimide and 1,3-bis (citraconimido-methyl) benzene is incorporated into rubber in combination with processing aids and other materials to prepare formulations for use in preparing the layers of the RMT tire comprising the belt coat compounds.

The rubber component comprises a rubber selected from the group consisting of natural rubber, a rubber derived from a diene monomer, and mixtures thereof.

Examples of rubbers for use in the present invention include substituted and unsubstituted, saturated and unsaturated, natural and synthetic polymers.

The preferred synthetic rubber which may be used with the present invention is cis-1,4-polyisoprene. When the compounds of the present invention are used as a belt coat composition, natural rubber is preferably present and may even be partially replaced with some synthetic rubber. When used as a blend, the natural rubber is preferably present in an amount ranging from 5 to 95 weight percent of the total rubber present in the belt coat compound.

Conventional rubber additives may be incorporated in the rubber stock of the present invention. The additives commonly used in rubber stocks include fillers, plasticizers, waxes, processing oils, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. The carbon black may be incorporated into the formulation at a concentration of from about 30 to about 70 phr. Commonly employed carbon blacks can be used as a conventional filler. Representative examples of such carbon blacks include N220, N326, N330 and N347. These carbon blacks have iodine absorptions ranging from 70 to 130 g/kg and DBP Numbers ranging from 65 to 135 $cm^3/100$ g.

Plasticizers are conventionally used in amounts ranging from about 1 to about 7 phr with a range of about 2 to about 5 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products and cumarone-indene resins. Common waxes which may be used include paraffinic waxes and microcrystalline blends. Such waxes are used in amounts ranging from about 0.0 to 3 phr. Materials used in compounding which function as an accelerator-activator include metal oxides such as zinc oxide which can be used in conjunction with acidic materials such as fatty acid, for example, stearic acid, oleic acid and the like. The amount of the metal oxide may range from about 3 to about 10 phr with a range of from about 7 to about 9 phr being preferred. The amount of fatty acid which may be used may range from about 0 phr to about 5 phr with a range of from about 0 phr to about 2 phr being preferred. Rubber peptizers, such as 2,2'-dibenzamido-diphenyl disulfide, are usually incorporated into the first non-productive mix.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2 phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

Siliceous pigments may be used in the rubber compound applications of the present invention, including pyrogenic and precipitated siliceous pigments (silica), although precipitated silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*. Volume 60, page 304 (1930). The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc.; silicas available from Rhone-Poulenc, with, for example, designations of Z1165 MP and Z165GR; and silicas available from Degussa AG with, for example, designations VN2 and VN3, etc. Generally speaking, the amount of silica may range from 5 to 30 phr.

A class of compounding materials known as scorch retarders are commonly used. Salicylic acid, sodium acetate and N-cyclohexyl thiophthalimide are known retarders. Retarders are generally used in an amount ranging from about 0.1 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamides and other diaryl amine derivatives, para-phenylenediamines, quinolines and mixtures thereof. Specific examples of such antidegradants are disclosed in The Vanderbilt Rubber Handbook (1990), pages 282-286. Antidegradants are generally used in amounts of about 0.25 to about 5 phr with a range of from about 1 to about 3 phr being preferred.

The bismaleimide material, m-phenylenediamine bismaleimide (PDBM), has certain anti-reversion properties, and is incorporated into the formulation at a concentration of between about 0.5 and about 4 parts per hundred rubber (phr), and preferably within the range of about 0.5 to about 2 phr.

Bis-(3-triethoxysilylpropyl)-tetrasulfide (TSPT) is incorporated into the formulation at a concentration of between about 0.7 and about 3 phr, and preferably within the range of about 1 to about 3 phr.

1,3-bis (citraconimido-methyl) benzene (CIMB) also has anti-reversion properties, and is commercially available as Perkalink 900, from Flexsys, Akron, Ohio. CIMB is incorporated into the formulation at a concentration of between about 0.3 to about 1 phr, and preferably within the range of about 0.5 to about 1 phr.

The sulfur vulcanizable rubber compound is cured at a temperature ranging from about 125° C. to about 180° C. Preferably, the temperature ranges from about 135° C. to about 160° C.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) of the preceding non-productive mix stage(s). Cobalt materials, if used, are mixed in one of the non-productive stages. The sulfur and accelerator(s) are generally mixed in the productive mix stage. The terms "non-productive" and "productive" mix stages are well known to those having skill in the rubber mixing art.

The rubber composition of this invention is directed to steel belt coat compounds. Pneumatic tires can be built, shaped, molded and cured by various methods which are known and will be readily apparent to those having skill in such art. Even though RMT tires are discussed herein, this concept could be applied to a steel belted passenger tire, truck tire, steel belted OTR tire and the like.

The present invention may be better understood by reference to the following examples in which the parts or percentages are by weight unless otherwise indicated.

EXAMPLES

Each rubber stock was prepared in a three non-productive and one productive Banbury mix procedure. The non-productive stages for both samples contained synthetic polyisoprene, natural rubber, cobalt compound (if used), and conventional amounts of processing oil, stearic acid, zinc oxide, carbon black, anti-degradants and silica. Conventional amounts of accelerators, antidegradants, zinc oxide and sulfur were added during the productive stage.

Cure properties were determined using a Monsanto oscillating disc rheometer which was operated at a temperature of 150° C. and 100 cycles per minute. A description of oscillating disc rheometers can be found in the Vanderbilt rubber Handbook edited by Robert F. Ohm (Norwalk, Conn., R.T. Vanderbilt Company, Inc. 1990), pages 554-557. The use of this cure meter and standardized values read from the cure are specified in ASTM D-2084. A typical cure curve obtained on an oscillating disc rheometer is shown on page 55 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock to be tested that is required to oscillate the rotor at the vulcanization temperature is measured. The values obtained using this cure test are very significant since changes in the rubber or the compounding recipe are very readily detected.

Table 1 below sets out the formulations which were evaluated. The remaining tables report a variety of properties of the tested formulations, including cure properties that were determined from cure curves obtained for the rubber stocks that were prepared. These properties include a torque minimum (Min. Torque), a torque maximum (Max Torque), minutes to 25 percent of the torque increase (t25) and minutes to 90 percent of the torque increase (t90).

Peel adhesion testing was done to determine the interfacial adhesion between the rubber formulations that were prepared. The interfacial adhesion was determined by pulling one compound from another at a right angle to the untorn test specimen with the two right ends being pulled apart at a 180° angle to each other using an Instron machine. The area of contact was determined from placement of a Mylar® sheet between the compounds during cure. A window in the Mylar® allowed the materials to come into contact with each other during testing.

Standard wire adhesion tests (SWAT) were conducted by embedding a single brass-plated cord in the respective rubber compositions. The rubber articles were then cured at 150° C. for 32 minutes. The steel cord in these rubber compositions were then subjected to a pull-out test, according to ASTM Standard D2229-73. The results of these pull-out tests (SWAT) are given below and identified as Original in Table 2 and expressed in Newtons. Adhesion tests were also conducted on the rubber articles after curing and then aging the cured samples for (1) 5 days under anaerobic conditions at 90° C., (2) 20 days in water at 90° C., and (3) 10 days at 90% relative humidity at 75° C. Unless otherwise indicated, the data set out in the tables are the result of single measurements.

The combination of bis-(3-triethoxysilylpropyl)-tetrasulfide, m-phenylenediamine bismaleimide and 1,3-bis (citraconimido-methyl) benzene, incorporated into wire coat formulations for RMT tires, provides a range of advantageous characteristics to the cured formulation. Improvements are thus observed utilizing a range of tests.

The improvements to the performance characteristics of various rubber formulations incorporating the bis-(3-triethoxysilylpropyl)-tetrasulfide, m-phenylenediamine bismaleimide and 1,3-bis (citraconimido-methyl) benzene relative to other rubber formulations utilizing only a standard silane coupler, or bis-(3-triethoxysilylpropyl)-tetrasulfide and m-phenylenediamine bismaleimide only, are set out in the formulation and analysis tables below. Amounts of ingredient in the individual rubber formulations set out below are represented in parts per hundred rubber (phr).

Table 1 below sets out the various formulations which were the subject of testing to demonstrate the overall advantages of the additive package after incorporation into the formulations.

TABLE 1

| Compound | Formulation No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Polyisoprene | 100 | 100 | 100 | 100 | 100 | 100 | 100 | 100 | 100 | 100 | 100 | 100 | 100 | 100 | 100 |
| N347 Carbon Black | 45 | 55 | 55 | — | — | — | — | — | — | 45 | 45 | 45 | 45 | — | — |
| N326 Carbon Black | — | — | — | 57 | 57 | — | — | — | — | — | — | — | — | — | 57 |
| N220 Carbon Black | — | — | — | — | — | 55 | 55 | 55 | 55 | — | — | — | — | 55 | — |
| Silica | 15 | 10 | 10 | 13 | 13 | 13 | 13 | 13 | 13 | 15 | 15 | 15 | 15 | 10 | 10 |
| Plasticizer | 1.5 | 1.5 | 1.5 | 3 | 3 | 3 | 3 | 3 | 3 | 1.5 | 1.5 | 1.5 | 1.5 | 3 | 3 |
| TBBS[1] | 0.8 | 0.8 | 0.8 | — | — | — | — | — | — | 0.8 | 0.8 | 0.8 | 0.8 | — | — |
| DCBS[2] | — | — | — | 0.85 | 0.85 | 0.85 | 0.85 | 0.85 | 0.85 | — | — | — | — | 0.85 | 0.85 |
| TSPT[3] | 2 | 1.5 | 1.5 | 2 | 2 | 2 | 2 | 2 | 2 | 2 | 1.5 | 1.5 | 2 | 2 | 2 |
| PDBM[4] | — | 0.75 | 0.75 | 1 | 1 | 1 | 1 | 1 | 1 | — | 0.75 | 0.75 | — | 1 | 1 |
| CIMB[5] | — | — | 0.6 | — | 0.6 | — | — | 0.75 | 0.75 | — | — | 0.9 | — | 0.6 | 0.75 |
| Sulfur | — | — | — | — | — | — | — | — | — | 5.2 | 5.2 | 5.2 | 5.2 | 4 | 4 |

[1]N-tert-Butyl-2-benzothiazolesulfenamide
[2]N,N-Dicyclohexyl-2 benzothiazolesulfenamide
[3]bis-(3-triethoxysilylpropyl)-tetrasulfide
[4]m-phenylenediamine bismaleimide
[5]1,3-bis (citraconimido-methyl) benzene Table 2 below sets out the various evaluation tests conducted on products produced using formulation set A, and test results. In evaluating data set out in the tables, higher numbered data results for a particular test indicate an improved property response for that formulation unless otherwise stated. In the case of % reversion and crack growth rate, lower numbered data results indicate an improved property response.

TABLE 2

| Test | Formulation Set A | | |
|---|---|---|---|
| | Formulation 1 | Formulation 2 | Formulation 3 |
| I. ATS 32 minutes (')/150C-days at 100C (Anaerobic) | | | |
| Tensile | 20.04 | 17.89 | 19.56 |
| II. ODR Rheometer @ 150C with Reversion, 120' | | | |
| % Reversion to 70' Torque | 25.23% | 6.20% | 4.14% |
| III. MDR Rheometer @ 150C with Reversion | | | |
| % Reversion (drop max to 60' Torque) | 9.48% | 3.50% | 1.17% |
| IV. SWAT 5 Days @ 120C (Anaerobic) | 100 | 142 | 127 |
| SWAT 20 Days @ 90C (Water) | 100 | 119 | 120 |
| V. RPA Base 191C | | | |
| Cured G' (Hardness), 1% Strain/1 Hz | 3315 | 4829 | 5329 |
| Cured G' (Hardness), 10% Strain/1 Hz | 1967 | 2275 | 2452 |
| VI. RPA Base 150C | | | |
| Cured G' (Hardness), 1% Strain/1 Hz | 3453 | 4495 | 4819 |
| Cured G' (Hardness) 10% Strain/1 Hz | 2321 | 2526 | 2662 |
| VII. RDS/ARES Strain Sweep @ 90C and 10Hz | | | |
| 6% Shear Strain Rating | — | 100 | 114 |
| 10% Shear Strain Rating | 100 | 114 | 128 |
| 12% Shear Strain (RRCS) Rating | 100 | 113 | 126 |
| 24-25% Strain (RRCS) Rating | 100 | 100 | 100 |
| 39-40% Strain (INFO) Rating | 100 | 107 | 116 |

Table 3 below sets out the various evaluation tests conducted on products produced using formulation set B, and test results.

TABLE 3

| Test | Formulation Set B | |
|---|---|---|
| | Formulation 4 | Formulation 5 |
| I. ATS 32'/150-Original | | |
| 300% Modulus (Mpa) | 17.65 | 18.82 |
| II. ATS 32'/150C-4 Days @ 100C (Anaerobic) | | |
| 200% Modulus | 12.5 | 14.39 |
| III. MDR Rheometer @ 150C with Reversion | | |
| % Reversion (Drop Max to 120' Torque) | 16.97% | 6.64% |
| IV. SWAT 5 Days @ 120C (Anaerobic) | 100 | 107 |
| SWAT 20 Days @ 90C (Water) | 100 | 110 |
| V. RPA Base 191C | | |
| Cured G' Hardness, 1% Strain/1 Hz | 5743 | 6657 |
| VI. RPA Base 150C | | |
| Cured G' Hardness, 1% Strain/1 Hz | 5509 | 6370 |
| VII. Metravib Strain Sweep @ 7.8 Hz, 32'/150C @ 90C | | |
| 1% Shear Strain Rating | 143 | 173 |
| 2% Shear Strain Rating | 132 | 157 |
| 5% Shear Strain Rating | 119 | 139 |
| 10% Shear Strain Rating | 114 | 132 |
| 19-20% Shear Strain Rating | 115 | 137 |

Table 4 below sets out the various evaluation tests conducted on products produced using formulation set C, and test results.

TABLE 4

| | Formulation Set C | | | |
|---|---|---|---|---|
| Test | Formulation 6 | Formulation 7 | Formulation 8 | Formulation 9 |
| I. MDR Rheometer @ 150C with Reversion | | | | |
| % Reversion to 120' Torque | 11.60 | 11.59 | 3.25 | 4.95 |
| II. RPA Base 191C | | | | |
| Cured G' (Hardness), 1% Strain/1 Hz | 6864.2 | 7119.2 | 8277.4 | 7459.3 |

Table 5 below sets out the various evaluation tests conducted on products produced using formulation set D, and test results.

TABLE 5

| | Formulation Set D | | |
|---|---|---|---|
| Test | Formulation 10 | Formulation 11 | Formulation 12 |
| I. ATS 32'/150C-4 Days @ 100C N2 | | | |
| Tensile | 15.51 | 16.59 | 18.79 |
| II. MDR Rheometer @ 150C with Reversion, 120' | | | |
| % Reversion to 120' Torque | 9.25% | 5.22% | 3.24% |
| III. Peel Adhesion 95C, 32'/150C-to itself | | | |
| Unaged Steady State Average Load (Newtons) | 108.58 | 146.08 | 203.69 |
| Steady State Average Load 4 Days @ 120C (Anaerobic) | 59.11 | 73.13 | 108.43 |
| IV. SWAT 5 Days @ 120C (Anaerobic) | 100 | 133 | 129 |
| V. RPA Base 191C | | | |
| Cured G' (Hardness), 1% Strain/1 Hz | 3050 | 3028 | 3432 |

Table 6 below sets out the various evaluation tests conducted on products produced using formulation set E, and test results.

TABLE 6

| | Formulation Set E | | |
|---|---|---|---|
| Test | Formulation 13 | Formulation 14 | Formulation 15 |
| I. ATS 32'/150C - Original | | | |
| 300% Modulus (Mpa) | 19.39 | 19.75 | 17.21 |
| Tensile (Mpa) | 21.41 | 22.08 | 20.74 |
| Elongation | 363 | 371 | 394 |
| Shore A Hardness @ Room Temp | 78.4 | 85.1 | 81.5 |
| Rebound @ 100C | 64.2 | 49.2 | 53.4 |
| II. ATS 32'/150C - 5 D Anaerobic @ 120C | | | |
| 100% Modulus (Mpa) | Lost | 6.89 | 5.09 |
| Tensile (Mpa) | 3.84 | 7.23 | 9.65 |
| Elongation | 93 | 120 | 185 |
| Shore A Hardness @ Room Temp | 82.6 | 88.8 | 83.3 |
| Rebound @ 100C | 54.4 | 46.2 | 48.6 |
| III. MDR Rheometer @ 150C with Reversion | | | |
| % Reversion to 60' Torque | 9.02% | | |
| % Reversion to 120' Torque | | 0.54% | 7.61% |
| IV. Mooney Scorch - 5 Point Rise @ 135C | | | |
| Minutes | 35.82 | 38.73 | 43.5 |
| V. Peel Adhesion, 32'/150C To Itself - Original | | | |
| Steady State Avg. Load (Newtons) | 28.17 | 85.74 | 45.27 |

TABLE 6-continued

|  | Formulation Set E | | |
|---|---|---|---|
| Test | Formulation 13 | Formulation 14 | Formulation 15 |
| VI. SWAT Adh 5 Days Anaerobic @ 120C 32'/150C | | | |
| Average (Newtons) | 645 | 898 | 847 |
| % Coverage | 93% | 100% | 100.5% |
| VII. SWAT Adh 10 Days Anaerobic @ 120C 32'/150C | | | |
| Average (Newtons) | 720 | 934 | 915 |
| % Coverage | 91% | 99% | 99% |
| VIII. SWAT Adh 20 Days Water @ 90C 32'/150C | | | |
| Average (Newtons) | 620 | 749 | 754 |
| % Coverage | 87% | 87% | 94% |
| IX. RPA Base 191C | | | |
| Cured G' (Hardness), 1% Strain/1 Hz | 3751 | 7167 | 6259 |
| Cured G' (Hardness), 10% Strain/1 Hz | 1955 | 2556 | 2478 |
| Cured G' (Hardness), 50% Strain/1 Hz | 937 | 996 | 938 |
| Cured Tangent Delta, 10% Strain/1 Hz | 0.16 | 0.254 | 0.215 |
| X. RPA Base 150C | | | |
| Cured G' (Hardness), 1% Strain/1 Hz | 4128 | 7667 | 5802 |
| Cured G' (Hardness), 10% Strain/1 Hz | 2640 | 3373 | 2869 |
| Cured G' (Hardness), 50% Strain/1 Hz | 1645 | 1715 | 1531 |
| Cured Tangent Delta, 10% Strain/1 Hz | 0.098 | 0.186 | 0.157 |
| XI. RDS/ARES Strain Sweep, 32'/150C @ 90C | | | |
| 1% Shear Strain | | | |
| G' | 5.505 | 9.5956 | 7.6706 |
| Tangent Delta | 0.08898 | 0.12469 | 0.11884 |
| 2% Shear Strain | | | |
| G' | 4.604 | 7.4102 | 6.1381 |
| Tangent Delta | 0.11538 | 0.1707 | 0.15091 |
| 5% Shear Strain | | | |
| G' | 3.626 | 4.9936 | 4.2616 |
| Tangent Delta | 0.12628 | 0.22116 | 0.19511 |
| 10% Shear Strain | | | |
| G' | 3.087 | 3.7736 | 3.2297 |
| Tangent Delta | 0.11711 | 0.22808 | 0.1986 |
| XII. RDS/ARES Strain Sweep, 32'/150C @ 30C | | | |
| 1% Shear Strain | | | |
| G' | 6.9783 | 17.575 | 11.544 |
| Tangent Delta | 0.10994 | 0.14122 | 0.14243 |
| 2% Shear Strain | | | |
| G' | 5.771 | 13.145 | 8.7493 |
| Tangent Delta | 0.15203 | 0.20973 | 0.20644 |
| 5% Shear Strain | | | |
| G' | 4.3094 | 8.3304 | 5.6944 |
| Tangent Delta | 0.19112 | 0.27823 | 0.26198 |
| 10% Shear Strain | | | |
| G' | 3.4758 | 5.6953 | 4.0687 |
| Tangent Delta | 0.19467 | 0.29338 | 0.26538 |

Consideration of the above test results set out in Tables 2 through 6 reveals the following. Incorporation of the three additive materials (bis-(3-triethoxysilylpropyl)-tetrasulfide, m-phenylenediamine bismaleimide and 1,3-bis (citraconimido-methyl) benzene) in combination with the rubber formulation set out in Table 1 provide improved tensile strength retention, modulus retention, reversion resistance, dynamic stiffness, and tear resistance relative to comparison formulations which do not contain the three additive materials. Compounds with these ingredients exhibit increased compound hysteresis; however, they show increased resistance to heat reversion.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative methods and illustrative examples shown and described. Accordingly, departures may be made from such details without departing from the scope or spirit of applicant's general inventive concept.

What is claimed is:

1. A radial medium truck tire comprising:
   a belt defining a rubber-coated steel tire cord, the rubber coating comprising:
   (a) a rubber selected from the group consisting of natural rubber, a rubber derived from a diene monomer and mixtures thereof;
   (b) from about 0.5 to about 4 parts per hundred rubber of m-phenylenediamine bismaleimide;
   (c) from about 0.7 to about 3 parts per hundred rubber of bis-(3-triethoxysilylpropyl)-tetrasulfide; and
   (d) from about 0.3 to about 1 parts per hundred rubber of 1,3-bis (citraconimido-methyl) benzene.

2. The tire of claim 1 wherein the concentration of m-phenylenediamine bismaleimide is in the range of about 0.5 to about 2 parts per hundred rubber.

3. The tire of claim 1 wherein the concentration of 1,3-bis (citraconimido-methyl) benzene is in the range of about 0.5 to about 1 parts per hundred rubber.

4. The tire of claim 1 wherein the rubber is cis-1,4-polyisoprene.

5. The tire of claim 1 wherein the concentration of bis-(3-triethoxy silylpropyl)-tetrasulfide is in the range of about 1 to about 3 parts per hundred rubber.

6. The tire of claim 1 wherein the rubber coating further comprises carbon black.

7. The tire of claim 6 wherein the carbon black has a concentration in the range of about 30 to about 70 parts per hundred rubber.

8. The tire of claim 1 wherein the steel tire cord is brass coated.

* * * * *